(12) United States Patent
Gardner

(10) Patent No.: US 6,412,084 B1
(45) Date of Patent: Jun. 25, 2002

(54) CONTROL OF COMPUTER PERIPHERALS

(75) Inventor: Thomas Godfrey Gardner, Long Ashton (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/155,845

(22) PCT Filed: Feb. 5, 1998

(86) PCT No.: PCT/GB98/00357

§ 371 (c)(1),
(2), (4) Date: Oct. 7, 1998

(87) PCT Pub. No.: WO98/35292

PCT Pub. Date: Aug. 13, 1998

(30) Foreign Application Priority Data

Feb. 7, 1997 (EP) .............................. 97300798

(51) Int. Cl.⁷ ............................................... G06F 11/28
(52) U.S. Cl. ........................................................ 714/50
(58) Field of Search ........................................... 714/50

(56) References Cited

U.S. PATENT DOCUMENTS

| | | | | |
|---|---|---|---|---|
| 5,414,731 A | * | 5/1995 | Antunes et al. ............. | 375/134 |
| 5,893,031 A | * | 4/1999 | Hoogerwerf et al. ....... | 455/410 |
| 5,903,847 A | * | 5/1999 | Heiskari et al. ............. | 455/509 |
| 5,911,078 A | * | 6/1999 | Anderson .................... | 710/268 |
| 6,148,346 A | * | 11/2000 | Hanson ....................... | 709/321 |

FOREIGN PATENT DOCUMENTS

| EP | 015 445 A | 9/1980 |
|---|---|---|
| EP | 615 188 A | 9/1994 |

* cited by examiner

*Primary Examiner*—Paul R. Myers

(57) ABSTRACT

In computer system comprising a computer (10) and a peripheral (such as a radio transceiver card 18), the computer is operable to run a device driver (28a) for the peripheral and an application (30a), and the computer is operable to produce a command ($CO_N$) in dependence upon the application and device driver and to make the command available to the peripheral to control the peripheral. In order to enable the peripheral to have low intelligence, not requiring its own microprocessor, but prevent inappropriate commands being actioned by the peripheral, the peripheral is operable in response to receipt of such a command to compute a challenge ($CH_N$) and to make the challenge available to the computer. The computer is then operable in dependence upon the device driver to compute a response ($R_N$) which is a first predetermined function, at least in part, of the challenge and to make the response available to the peripheral. The peripheral is operable to test the response and to execute or not execute the command in dependence upon the result of the test.

12 Claims, 2 Drawing Sheets

CONTROL OF COMPUTER PERIPHERALS

This invention relates to computer systems and methods of operation thereof.

In particular, a first aspect of the invention is concerned with a computer system comprising a computer (such as a general purpose microcomputer) and a peripheral, the computer being operable to run a device driver for the peripheral and an application, and the computer being operable to produce a command or data in dependence upon the application and device driver and to make the command or data available to the peripheral for use by it, for example by placing the command or data in one or more registers or memory locations of the computer to which the peripheral has access. Such a system is well known.

One known form of computer peripheral is a radio transmitter. A problem with radio peripherals is preventing them transmitting on unauthorised frequency bands or at unauthorised times. To deal with this problem, it is known to provide such a peripheral which includes its own dedicated microcomputer which generates only authorised frequency band settings or which ignores any unauthorised frequency band settings requested by the main computer and which only turns on the transmitter at an authorised time. This adds to the expense of the peripheral, but such radio peripherals have been able to obtain regulatory approval.

To reduce cost, there is a desire to produce radio peripherals which do not need to include their own dedicated microcomputer, but the problem is that the correct operation is dependent (a) on correct operation of the peripheral, (b) on correct operation of its device driver, and (c) on the main computer or its software not writing other data to the registers or memory locations in use by the peripheral. Accordingly, there is a reluctance on the part of the regulatory authorities to grant approval for such an arrangement.

Although the problems with which the invention is concerned have been described above in relation to radio peripherals, it is envisaged that similar problems may arise in connection with other types of peripheral such a telephony equipment or medical equipment.

The first aspect of the present invention is characterised in that: the peripheral is operable in response to receipt of a command to compute a challenge and to make the challenge available to the computer, the computer is operable in dependence upon the device driver to compute a response which is a first predetermined function, at least in part, of the challenge and to make the response available to the peripheral; and the peripheral is operable to test the response and to execute or not execute the command in dependence upon the result of the test. Accordingly, the invention can substantially eliminate the possibility of a rogue program causing serious malfunction of the peripheral.

(In this specification, the term "compute" includes any kind of general or special purpose computing or information processing device, the functionality of which is defined by programmed instructions, for example in the form of software or firmware; likewise "peripheral" includes any ancillary device which may be connected, permanently or removably and internally or externally, to a computer, and "device drive" includes any programmed instructions for enabling a computer to co-operate with a peripheral.)

The challenge may be arbitrary, but for improved security it is preferably a second predetermined function, at least in part, of the command.

In the case where the computer is operable to produce a series of such commands, and the peripheral is operable to compute a series of such challenges each corresponding to a respective one of the commands, each challenge is preferably, for improved security, said second predetermined function not only of the respective command, but also of at least one previous such command and/or challenge.

In the case where the computer is also operable to compute a series of such responses each corresponding to a respective one of the challenges, each response is preferably, for improved security, said first predetermined function not only of the respective challenge, but also of the respective command and/or at least one previous command and/or previous challenge and/or previous response.

In one embodiment, the peripheral is operable so to test the or each response by computing a validation which is said first function, at least in part, of the or the respective challenge, and by testing the equality of the validation and the response. In this case, the peripheral preferably does not make the validation available to the computer, otherwise a rogue program might read the validation and set the response to be the same.

In accordance with a second aspect of the present invention, there is provided a method of operation of a computer and a peripheral therefor using a device driver for the peripheral, wherein: the computer makes a command available to the peripheral in dependence upon the device driver; and the peripheral is operable to execute the command; characterised in that: in response to receipt of such a command, the peripheral computes a challenge and makes the challenge available to the computer, the computer computes, in dependence upon the device driver, a response which is a first predetermined function, at least in part, of the challenge and makes the response available to the peripheral; and the peripheral tests the response and determines whether to execute or not to execute the command in dependence upon the result of the test.

A specific embodiment of the present invention will now be described, by way of example, with reference to the accompanying drawings, in which.

Figure 1:
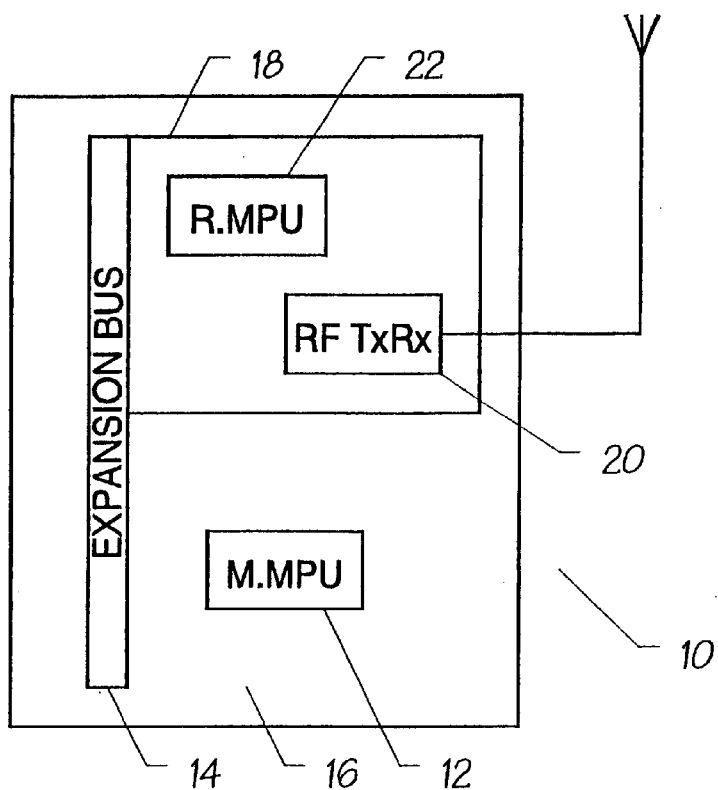
FIG. 1 is a block diagram of a known computer system with a radio card.

In the computer system of FIG. 1, a computer 10, such as a PC, has a main microprocessor unit 12 and an expansion bus 14 on a motherboard 16. A number of expansion cards are connected to the expansion bus 14, including a radio card 18. In the known system, the radio card 18 includes a radio transceiver 20 and a microprocessor unit 22. Commands are issued to the radio card 18, and the intelligence of the microprocessor unit 22 of the radio card 18 is used to ensure that inappropriate commands are not executed and that the radio transceiver 20 operates correctly in the manner for which regulatory approval has been given.

Figure 2:
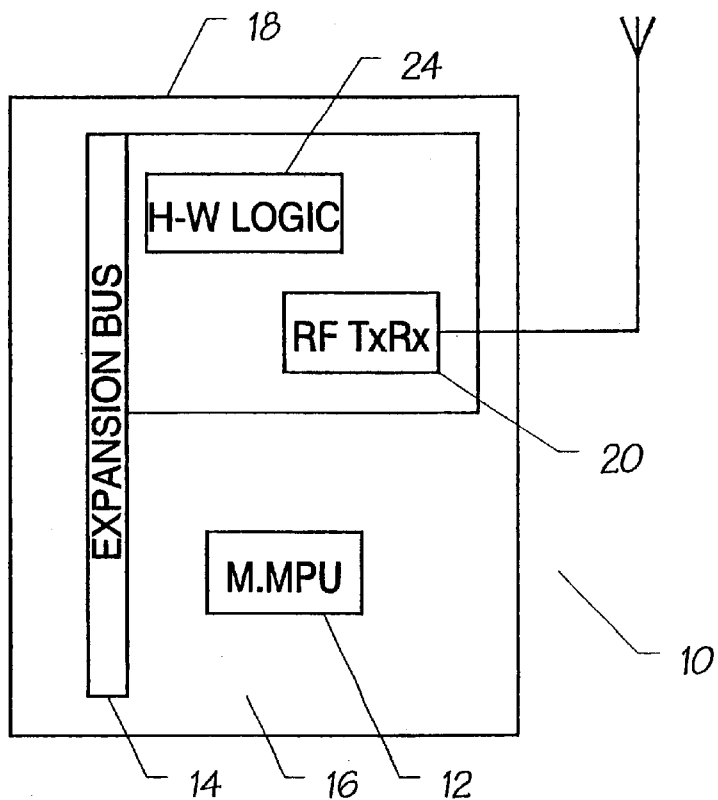
FIG. 2 is a block diagram of an embodiment of computer system in accordance with the invention.

As shown in FIG. 2, in the embodiment of the invention, the radio card 18 does not have its own microprocessor unit, but instead employs hardwired logic 24.

Figure 3:
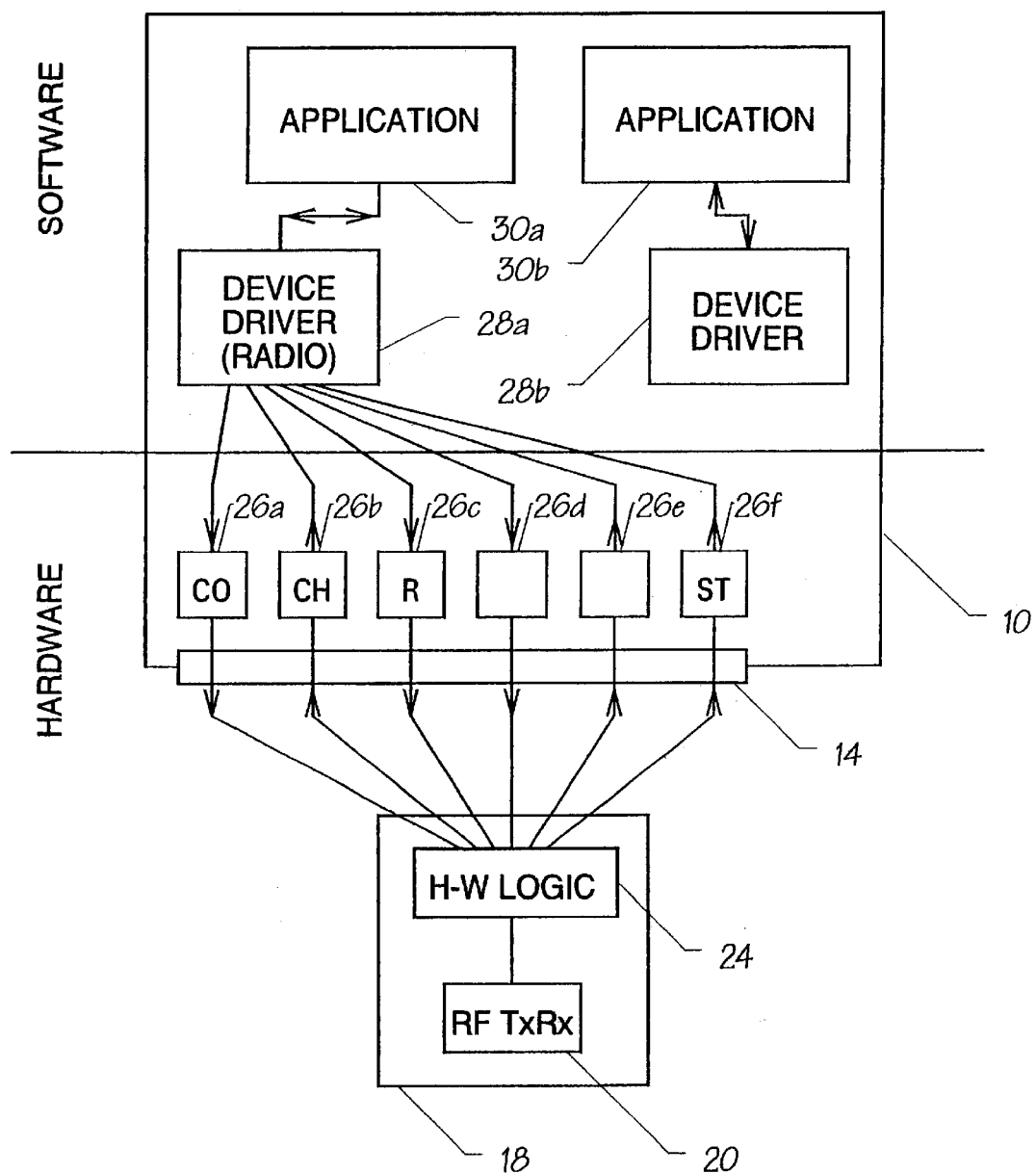
FIG. 3 is a diagram to illustrate interaction between the software and the hardware of the system of FIG. 2.

Referring in particular to FIG. 3, the computer 10 has a series of registers 26, six of which are shown as 26a to 26f and the contents of these registers are available to the hardwired logic 24 of the radio card 18 for reading or writing. Any program running on the computer 10 can write to any of the registers, deliberately, or accidentally, but the convention is that only authorised device drivers write to the registers. A computer would typically have many device drivers loaded, and FIG. 3 shows two device drivers 28a, 28b, one of which is the device driver 28a for the radio card 18. FIG. 3 also shows two applications 30a, 30b running on the computer 10, and one of the applications 30a makes use of the radio card 18, communicating with it via the device driver 28a, and the registers 26a to 26f.

An example of the operation of the embodiment described above, including the relevant parts of the programming of the computer 10 by the application 30a and the device driver 28a and the hardwire programming of the radio card 18 by the logic 24, will now be described. In the example, the registers 26 are used as follows:

Register 26a is an output register for "command" words from the device driver 28a to the hardwired logic 24;

Register 26b is an input register for "challenge" words from the hardwired logic 24 to the device driver 28a;

Register 26c is an output register for "response" words from the device driver 28a to the hardwired logic 24;

Register 26d is an output register for data words from the device driver 28a to the hardwired logic 24;

Register 26e is an input register for data words from the hardwired logic 24 to the device driver 28a; and Register 26f is an input register for "status" words from the hardwired logic 24 to the device driver 28a.

When the application 30a issues a particular command, for example for setting the transmission carrier frequency for the transceiver 20, the device driver 28a causes a corresponding command word ($CO_N$) to be placed in the command register 26a. The hardwired logic 24 reads the content of the command register 26a and computes a challenge word, $CH_N$ which is a predetermined function $F_2$ of the current command word $CO_N$ and all previous command words $CO_1$ to $CO_{(N-1)}$ and challenge words $CH_1$ to $CH_{(N-1)}$ since the computer system was booted, or since the device driver 28a was loaded, or since the application 30a was opened. In other words:

$$CH_N = F_2(CO_N, CO_{(N-1)}, \ldots, CO_1, CH_{(N-1)}, CH_{(N-2)}, \ldots, CH_1).$$

The word $CH_N$ is placed in the challenge register 26b, whence it is caused by the device driver 28a to be read. The device driver then causes a response word, $R_N$, to be computed, which is a predetermined function $F_1$ of the current challenge word $CH_N$, the current command word $CO_N$ and all previous command words $CO_1$ to $CO_{(N-1)}$, challenge words $CH_1$ to $CH_{(N-1)}$ and response words $R_1$ to $R_{(N-1)}$ since the computer system was booted, or since the device driver 28a was loaded, or since the application 30a was opened. In other words:

$$R_N = F_1(CH_N, CH_{(N-1)}, \ldots, CH_1, CO_N, CO_{(N-1)}, \ldots, CO_1, R_{(N-1)}, R_{(N-2)}, \ldots, R_1).$$

The device driver 28a causes the computed response word $R_N$ to be placed in the response register 26c, whence it is read by the hardwired logic 24. Also, the hardwired logic computes a validation word, $V_N$, which is the same predetermined function $F_1$ of the current challenge word $CH_N$, the current command word $CO_N$ and all previous command words $CO_1$ to $CO_{(N-1)}$, challenge words $CH_1$ to $CH_{(N-1)}$ and validation words $V_1$ to $V_{(N-1)}$ since the computer system was booted, or since the device driver 28a was loaded, or since the application 30a was opened. In other words:

$$V_N = F_1(CH_N, CH_{(N-1)}, \ldots, CH_1, CO_N, CO_{(N-1)}, \ldots, CO_1, V_{(N-1)}, V_{(N-2)}, \ldots, V_1).$$

The hardwired logic 24 then compares the current validation and response words, $V_N$ and $R_N$. It should be noted that, if system is operating correctly, the current validation and response words, $V_N$ and $R_N$ should be equal. If they are equal, the hardwired logic 24 executes the command specified by the current command word $CO_N$. However, if they are not equal, the hardwired logic 24 does not execute that command, but instead disables the transceiver 20 and places an error word in the status register 26f. This inequality might arise because: the radio card 18 is malfunctioning; the device driver 28a is malfunctioning; the device driver 28a is incompatible with the radio card 18; or another device driver (for example device driver 28b) or other software is interfering with the operation of the radio card 18 and its device driver 28a. The error word is caused by the device driver 28a to be read, and to be relayed to the application 30a, which in turn causes the user to be advised of the error.

The ions $F_1$, $F_2$ should be ma de as complicated as is reasonably possible, while balancing this against the resulting complexity required for the hardwired logic 24. In a simple example, and in the case where M-bit words are employed:

$$CH_N = F_2(CO_N, CO_{(N-1)}, \ldots, CO_1, CH_{(N-1)}, CH_{(N-2)}, \ldots, CH_1)$$
$$= CO_N + \Sigma(CO_1 + CH_1), \text{ modulo } 2^M, \text{ for } I=1 \text{ to } (N-1); \text{ and}$$

$$V_N = F_1(CH_N, CH_{(N-1)}, \ldots, CH_1, CO_N, CO_{(N-1)}, \ldots, CO_1, V_{(N-1)}, V_{(N-2)}, \ldots, V_1) = CH_N + CO_N + \Sigma(CO_1 + CH_1 + V_1),$$
$$\text{modulo } 2^M, \text{ for } I=1 \text{ to } (N-1).$$

In this case, the hardwired logic 24 requires only two registers for the long-term storage of the history of the transactions, storing $\Sigma(CO_1 + CH_1)$ and $\Sigma(C\rho + CH_1 + V_1)$. In order to make the functions more complex, features such a bit rotation and inversion may be employed.

The scheme described above makes it extremely unlikely that the correct response word $R_N$ will be placed in the response register 26c unless the radio card 18 and the device driver 28a are properly matched and the computer 10 is not interfering with the proper operation. In a malicious attempt to override the validation scheme described above, an observer could monitor the computer bus to attempt to record the sequence of I/O operations resulting from a command. This is difficult, but even if they succeeded it would not be possible to replay a previous transaction, because the response words change with each transaction. The code of the device driver 28a could be disassembled. However, this requires a very serious reverse engineering effort, not casual hacking. To make this arbitrarily more awkward, the code of the device driver 28a could be stored in the computer 10 in scrambled form, with the code being unscrambled every time it is loaded into memory.

It will be appreciated that many modifications and developments may be made to the embodiment described above. For example, the challenge word CH could be a random value, or the function $F_2$ might be dependent only upon the current command word $CO_N$, and the function $F_1$ might be dependent only upon the current challenge word $CH_N$.

In the embodiment described above, the command, challenge and response words are placed in respective registers 26a to 26c. Alternatively, memory mapped I/O may be employed. Also, the radio card 18 has been shown as an internal card for the computer 10, but alternatively an external radio may be employed, connected to the computer 10 by a parallel port, serial port, SCSI interface or other interface.

The embodiment of the invention has been described above in the context of a computer having the architecture of a PC, but it will be appreciated that the invention is applicable to other forms of computer system.

What is claimed is:

1. A computer system comprising a computer and a peripheral, the computer being operable to run a device driver for the peripheral and an application, and the computer being operable to produce a command in dependence upon the application and device driver and to make the command available to the peripheral to control the peripheral; wherein:

the peripheral is operable in response to receipt of such a command to compute a challenge and to make the challenge available to the computer;

the computer is operable in dependence upon the challenge to compute a response which is a first predetermined function, at least in part, of the challenge and to make the response available to the peripheral; and the peripheral is operable to test the response and to execute or not execute the command in dependence upon the result of the test.

2. A system as claimed in claim 1, wherein the challenge is a second predetermined function, at least in part, of the command.

3. A system as claimed in claim 2, and in the case where the computer is operable to produce a series of such commands, and the peripheral is operable to compute a series of such challenges each corresponding to a respective one of the commands, wherein each challenge is said second predetermined function not only of the respective command, but also of at least one previous such command and/or challenge.

4. A system as claimed in claim 1, and in the case where the computer is operable to produce a series of such commands, the peripheral is operable to compute a series of such challenges each corresponding to a respective one of the commands, and the computer is operable to compute a series of such responses each corresponding to a respective one of the challenges, each response being said first predetermined function not only of the respective challenge, but also of the respective command and/or at least one previous command and/or previous challenge and/or previous response.

5. A system as claimed in claim 1, wherein the peripheral is operable so to test the or each response by computing a validation which is said first function, at least in part, of the or the respective challenge, and by testing the equality of the validation and the response.

6. A system as claimed in claim 5, wherein the peripheral does not make the validation available to the computer.

7. A system as claimed in claim 1, wherein the command and the response are made available to the peripheral, and the challenge is made available to the computer, by being placed in one or more registers and/or one or more memory locations, of the computer.

8. A system as claimed in claim 1, wherein the peripheral includes a radio transmitter, and at least one of the commands is operable to set the carrier frequency of the transmitter.

9. A system as claimed in claim 8, wherein the command and the response are made available to the peripheral, and the challenge is made available to the computer, by being placed in one or more registers, and/or one or more memory locations, of the computer, and the computer is operable to place desired frequency data in one of the registers or memory locations of the computer to which the peripheral has access.

10. A system as claimed in claim 1, wherein the peripheral is devoid of its own dedicated microcomputer.

11. A system as claimed in claim 1, wherein the computer is a general purpose microcomputer.

12. A method of operating a computer and a peripheral therefor using a device driver for the peripheral, wherein:

the computer makes a command available to the peripheral in dependence upon the device driver; and the peripheral is operable to execute the command; wherein:

in response to receipt of such a command, the peripheral computes a challenge and makes the challenge available to the computer;

the computer computes, in dependence upon the challenge, a response which is a first predetermined function, at least in part, of the challenge and makes the response available to the peripheral; and the peripheral tests the response and determines whether to execute or not to execute the command in dependence upon the result of the test.

* * * * *